United States Patent [19]

Cook et al.

[11] Patent Number: 5,452,319
[45] Date of Patent: Sep. 19, 1995

[54] METHOD AND SYSTEM FOR INCREASING THE RELIABILITY OF MULTIPLE FREQUENCY COMMUNICATION SYSTEMS

[75] Inventors: Michael W. Cook, Huntertown; Walter D. Slack, Fort Wayne, both of Ind.

[73] Assignee: ITT Corporation, New York, N.Y.

[21] Appl. No.: 77,590

[22] Filed: Jun. 17, 1993

[51] Int. Cl.⁶ .................................................. H04B 17/00
[52] U.S. Cl. .......................................... 375/202; 455/1; 455/62
[58] Field of Search .................... 375/1, 10, 40; 455/1, 455/62, 65

[56] References Cited

U.S. PATENT DOCUMENTS

| | | | |
|---|---|---|---|
| 5,225,902 | 7/1993 | McMullan, Jr. | 455/62 |
| 5,233,628 | 8/1993 | Rappaport et al. | 375/10 |
| 5,267,271 | 11/1993 | Rice | 375/1 |
| 5,325,394 | 6/1994 | Bruckert | 375/1 |

*Primary Examiner*—Salvatore Cangialosi
*Attorney, Agent, or Firm*—Kenyon & Kenyon

[57] ABSTRACT

The inherent structure of redundant information fields contained in the message format of a multifrequency communication system is utilized to determine if the information on the individual hops has been degraded due to interference. By detecting bit errors in the received data sequence and identifying the frequencies on which signals representing the bits in error were transmitted, one can block out data from those frequencies on a dynamic basis. The received data sequence is correlated against the possible code words that might have been transmitted. The result of this correlation is a decision by the receiver that a particular code word was transmitted. Then, the code word that the receiver decides was transmitted is compared against the received data sequence and bit errors are identified. Finally, by knowing the relationship between the transmission frequencies and the order of the received bits, the receiver can identify the frequencies on which signals representing the bits in error were transmitted. A sum of the errors associated with each frequency is maintained. When the sum exceeds some predetermined threshold, which will vary depending upon experience with each communication link, present and future data associated with the interfered frequency will be discarded from the decision process. Thus, the accuracy of the receiver's decisions will be improved; hence the reliability of the entire communication system will also be improved.

19 Claims, 4 Drawing Sheets

0100110001110000 = LOGIC ONE
⎫
10

1011001110001111 = LOGIC ZERO
⎫
12

METHOD AND SYSTEM FOR INCREASING THE RELIABILITY OF MULTIPLE FREQUENCY COMMUNICATION SYSTEMS

BACKGROUND OF THE INVENTION

The present invention relates generally to multiple frequency communication systems, and more particularly to a multiple frequency communication system that utilizes predetermined message formats and codewords to transmit information. Typical multiple frequency communication systems include frequency hopping communication systems, and spread spectrum communication systems, as well as digital communication systems that transmit simultaneously on many frequencies.

An example of a frequency hopping communication system is the U.S. Army's SINCGARS communication system, which is a frequency hopping communication system that utilizes predetermined message formats and information fields. This frequency hopping communication system, as well as all frequency hopping communication systems, are susceptible to interference from nearby communication systems transmitting at frequencies being used by the frequency hopping communication system. Typically, this type of interference causes data errors in the received bit sequence.

One method of preventing interference relies on identifying frequencies of potential interference sources and avoiding those frequencies during transmission. This method can only identify interfering sources that have previously occurred, and not those that occur only during a particular communication session.

Furthermore, this method requires performance of an RF survey of the area in which the communication session is to occur. This RF survey may occur long before a particular communication session occurs. One result is that if signals that were identified as potential interferers are no longer transmitting during a particular communication session, one has unnecessarily limited the choice of frequencies during that particular communication session. Another result is that frequencies that were identified as interference free frequencies may later contain interference sources that cause interference during a particular communication session. Furthermore, RF surveys are inherently fraught with error due to today's dynamic RF environment, realistic time and resource limitations, site access limitations and changing transmission bandwidths of new communication systems. In an attempt to take into account the dynamic RF environment, there have been attempts to use data from old RF surveys to project what the potential interference sources might be for a transmission link occurring in a particular location, even if the RF survey was not intended to gather data applicable to that location, or frequency bandwidth. The accuracy of such interpolation is dubious, at best. In any event, any RF survey presupposes one knows the locations in which the communication system will be used. However, a designer may not know all possible locations in which the communication system may be used. In fact, a communication system must be versatile and must allow its user the freedom to move between locations. Therefore the use of RF surveys has its limitations.

Finally, even an RF survey cannot determine the actual RF pattern for all transmitting and receiving locations and for all frequencies of interest. RF transmission patterns contain nulls at certain frequencies and location that prevent successful transmission. These nulls can arise from multipath transmission, for example, and are a function of many variables, such as the exact geography of the transmitting and receiving locations. This phenomena is often experienced by car phone users, whose received signal seems to fade in and out as the car travels. Therefore, although all frequencies containing potential interference sources may have been successfully identified and blocked out using an RF survey, reliable transmission may still be impossible at particular locations, which are unknown prior to attempting transmission.

The present invention is directed to the problem of developing a multiple frequency communication system and a method of operating a multiple frequency communication system that allows a user to transmit on all available frequencies, yet avoids those frequencies that will cause data errors in the transmission, on a dynamic basis. The present invention is also directed to the problem of developing a multiple frequency communication system that does not rely upon RF surveys to determine the frequencies of potential interference sources, and thus operates independently of the local RF environment. Finally, the present invention is directed to the problem of improving the data reliability of a frequency hopping communication system without increasing the complexity of the transmitter.

SUMMARY OF THE INVENTION

The present invention solves the above problem by utilizing the inherent structure of redundant information fields contained in the message format to determine if information transmitted on different frequencies has been degraded due to interference. By detecting bit errors in the received data sequence and identifying the frequencies (e.g., hop intervals for frequency hopping systems) on which signals representing the bits in error were transmitted, the present invention allows one to remove those errors at the receiver due to those frequencies on a dynamic basis.

The present invention correlates the received data sequence against the possible code words that might have been transmitted. The result of this correlation is a decision by the receiver that a particular code word was transmitted. Then the code word that the receiver decides was transmitted is compared against the received data sequence and bit errors are identified. Finally, by knowing the relationship between the transmission frequencies (e.g., hop intervals) and the order of the received bits, the receiver can identify the frequencies on which signals representing the bits in error were transmitted. A sum of the errors associated with each frequency is maintained. When the sum exceeds some predetermined threshold, which will vary with each communication link, data associated with the interfered frequency will be discarded from the final decision process. Thus, the accuracy of the receiver's decisions will be improved; hence the reliability of the entire communication system will also be improved.

An advantageous implementation of the method of the present invention distributes the information sequence consisting of several code words among the available frequencies so that different parts of each code word are transmitted on different frequencies. Then in the receiver, the receiver reverses the distribution performed in the transmitter on the received data sequence. The output from this reverse distribution is a sequence of codewords that may contain errors, but in an error free transmission, this sequence would consist of the codeword sequence as it existed prior to distribution.

One advantageous embodiment of the above method utilizes an interleaving technique to distribute the code words among each other. The interleaved sequence is then assigned to the available frequencies for transmission. To reverse the interleaving, the receiver comprises de-interleaves the received sequence to form the original information sequence.

A communication system operating according to the present invention transmits the codewords on several frequencies. The receiver receives a data sequence, and uses a correlator to correlate this data sequence against the expected code words used by the transmitter. An error detector detects an error bit in the received data sequence. A process identifies a frequency associated with the error bit. A register is assigned to each frequency for which an error bit has been associated, and is incremented by one upon detection of an error bit associated with that frequency. A comparator compares the contents of the register against a threshold to determine if the sum in the register exceeds the threshold. The receiver then drops those bits associated with that frequency from the received data sequence, if the sum contained in the register exceeds the threshold.

An advantageous implementation of the communication system of the present invention utilizes a second correlation against the expected code words using the received data sequence with the dropped bits. This improves the decision making of the receiver. The output from the second correlation results in the most probable transmitted sequence.

The communication system of the present invention utilizes means for distributing the information sequence consisting of several code words among the available frequencies so that different parts of each code word are transmitted on different frequencies. The receiver includes means for reversing the distribution performed in the transmitter on the received sequence. The end result is a received codeword sequence consisting of the transmitted code words, probably corrupted due to errors.

One advantageous embodiment of the means for distributing utilizes an interleaver for interleaving the code words among each other. The transmitter then assigns the interleaved sequence to the available frequencies for transmission. The means for reversing the distribution utilizes a deinterleaver for de-interleaving the received sequence to attempt to form the information sequence.

The present invention is also applicable to a frequency hopping communication system. In this case, since the frequencies are usually different during each hop, the receiver needs to only identify the hop interval on which the errors occurred. Furthermore, since the data from each hop interval can be processed serially, associating the errors with the hop interval and performing the correlation all occur before the next hop interval, simplifying the receiver processing.

In a first embodiment of the present invention as applied to a frequency hopping communication system, the transmitted message consists of an initialization segment, or phasing pattern, and the message segment, i.e., the redundant segment. First, the receiver performs bit synchronization and then tests the phasing pattern, which precedes the redundant data portion of the message. Information relative to the initial hop interval integrity is collected. Frame synchronization relative to the redundant portion of the message is determined.

Next, potential recovered error bits within the portion of the recovered data sequence currently being processed are identified. To perform this identification, the portion of the recovered data sequence that is to be processed is de-interleaved and the relative hop interval in which each data bit was received is identified. The deinterleaved sequence is then correlated against expected data patterns. The result is that the receiver is able to identify a potential received data pattern based on the original recovered (and yet uncorrected) data sequence. The potential received data pattern is then compared against the original de-interleaved data pattern. Those bits in the original de-interleaved data pattern that do not match the assumed data pattern (or potential received data pattern) are then designated as error bits, or misfits. Next, the hop intervals that are potentially interfered intervals are identified. This identification occurs by tracing each of the designated error bits back to the relative hop interval in which each designated error bit was received. The number of designated error bits associated with a relative hop interval are then summed. If this sum exceeds a preset threshold, then that hop interval is determined to be an interfered hop. Next, the data bits that were received during the suspected interfered hop intervals are dropped from the received data sequence. The remaining bits are then processed to determine the most probable data pattern. To determine the most probable data pattern, the remaining bits are correlated against the same expected data patterns that were used in the first correlation. This second correlation yields the most probable transmitted data pattern. This process is repeated until all redundant data is processed.

In an alternate embodiment, the receiver determines the most probable received redundant data pattern for the portion of the original recovered data being processed, based on available hop interval integrity information. Bit errors are the identified by comparing the original recovered data pattern against the most probable redundant data pattern that was just determined. These identified error bits that then used to update the hop interval integrity information.

The basic processing sequence occurs as follows. Initial hop interval integrity information is collected by testing the phasing pattern, which precedes the redundant data portion of the message. After bit synchronization, frame synchronization relative to the redundant portion of the message is then determined. All data bits that were received during suspected interfered hop intervals are dropped, and the remaining bits are then processed to determine the most probable data pattern. To make this determination, the portion of the recovered data sequence that is to be processed is first de-interleaved, and the relative hop interval in which each data bit received is identified. This de-interleaved data sequence, less all the data bits associated with hop intervals already determined to be interfered intervals, is correlated against expected data patterns. This correlation process yields the most probable transmitted data pattern. Next, potential recovered error bits, which are within the portion of the recovered data sequence currently being processed, are identified. To perform this identification, the de-interleaved data sequence, including any erroneous data bits, is compared against the most probable received redundant data pattern previously determined. This results in the receiver identifying error bits in the original (yet uncorrected) recovered data sequence. Next, the identification of those hop intervals that are potentially interfered intervals are updated. Each designated error bit is traced back to the relative hop interval in which it was received. The number of designated error bits associated with a relative hop interval are then summed. If this sum exceeds a present threshold, the that hop interval is determined to be an interfered hop. These, steps are then repeated until all redundant data is processed.

These two embodiments of the present invention allow for dynamic adaptation to the RF environment. By determining errors based on hop interval only, and by summing errors for that hop interval only, the receiver can then only discard data that was actually interfered with, and allow transmission on frequencies that might be in use, but did not cause interference in a particular instance. This allows for optimum efficiency and data throughput.

DETAILED DESCRIPTION

The method of the present invention will be described using an example of a frequency hopping communication system, however, the method operates similarly in any multifrequency communication system.

Figures 1, 2:
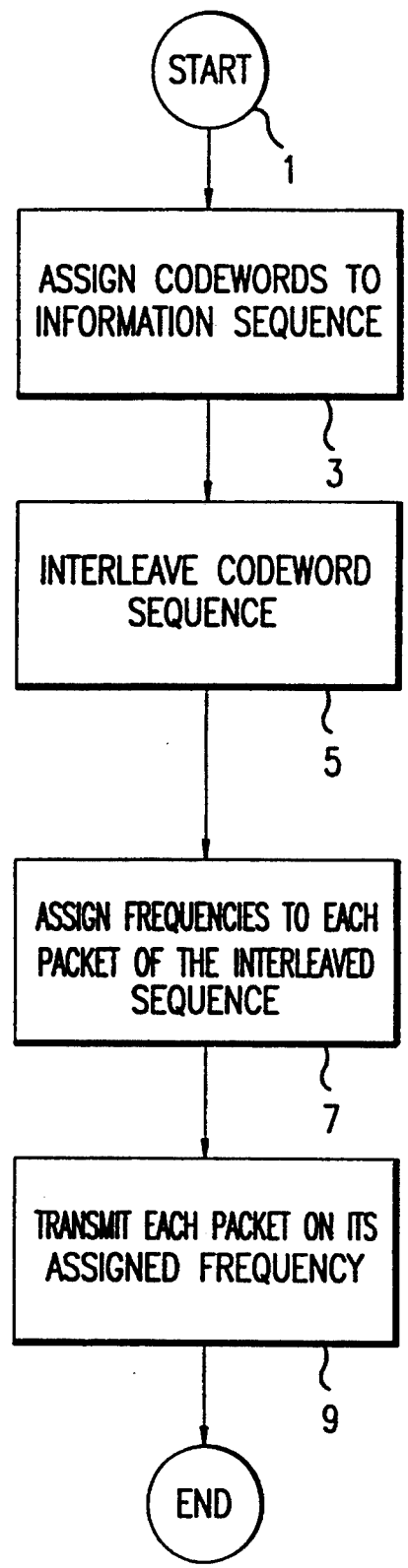
FIG. 1 depicts an example of two codewords used to represent information bits.
FIG. 2 depicts a flow chart of the method of the present invention for the transmitting end.

A frequency hopping communication system operating according to the present invention uses redundant information fields that make up a code sequence. Each code sequence, or code word, represents one bit of information to be transmitted. As depicted in FIG. 1, for example, a particular code word "0100110001110000" having a bit length of "n" bits, is used to transmit a logic state of "ONE", and the logical inversion of this code word "1011001110001111" is used to transmit a logic state of "ZERO." In FIG. 1, the bit length of the codewords is n=16. Thus, for each binary information bit to be transmitted, the communication system transmits the codeword associated with that bit rather than the bit itself. Each bit represents an information field. No particular code sequence is necessary to perform the method of the present invention, other than what is necessary to achieve initial frame synchronization. Codewords containing all ones or all zeros would be acceptable to perform the method of the present invention, however, they would make it difficult to achieve frame synchronization. Choosing a code word will depend upon other design factors that are not part of the present invention, such as the desire to remove DC components from the code words prior to RF transmission, so that choosing a code word of all zeros or all ones might prevent the actual transmitter from operating. Nonetheless, the choice of a particular code word will not impact the present invention beyond that stated above. Particularly suited for such codewords are those known as Barker codes, which have a high correlation when correlated against themselves, but a low correlation when correlated against shifted versions of themselves. This allows relatively easy identification of the beginning and ends of the frame, which is helpful in achieving frame synchronization.

Clearly, the frequency hopping communication described above contains redundant information, with the amount of redundancy depending on the length of the codeword, i.e., how large "n" is. In the codewords depicted in FIG. 1, the redundancy is fifteen bits, since sixteen bits are used to represent a single information bit. The frequency hopping communication system operating according to the present invention distributes this redundant information across several individual frequency hops in a predetermined format. The exact format of the distribution is not necessary for understanding the operation of the present invention. Rather, all that is required is that the redundant information be distributed among different frequency hops in a predetermined manner, so that the receiver can process the received signal and recreate the bit sequence as it existed prior to distribution among different frequency hops. A known method that performs this distribution is disclosed in Shu Lin & Daniel J. Costello, Jr., *Error Control Coding: Fundamentals and Applications* (1983) at 271. This reference discloses an interleaving code, with an interleaving degree of "i." By interleaving the codewords prior to choosing a frequency, different bits of the codeword will be assigned to different frequencies. The length "i" of the codeword will determine the maximum number of frequency hops among which the redundant information will be able to be distributed, or in other words, the interleaving degree of the interleaving code. By using a known interleaving code, known methods for performing the de-interleaving exist.

Thus, as depicted in FIG. 2, the method according to the present invention operates at the transmitter in the following manner. The transmitter assigns codewords to the information sequence. Thus, the resulting sequence of codewords (the codeword sequence) will be "n" times the length of the information sequence, where "n" equals the length of the codewords being used. Using the codewords depicted in FIG. 1 will result in an increase in the length of the data sequence by a factor of n=16.

The codeword sequence is then interleaved among itself so that the bits belonging to a single codeword are spread throughout the data sequence. To illustrate one possible interleaving technique, we shall consider the following example. A codeword sequence comprised of M codewords having a length N, such as:

$$S = CW_1 CW_2 \ldots CW_M = b_{11} b_{12} \ldots b_{1N}; b_{21} b_{22} \ldots b_{2N}; \ldots b_{M1} b_{M2} \ldots b_{MN} \quad (1)$$

becomes after interleaving:

$$S' = CW'_1 CW'_2 \ldots CW'_N = b_{11} b_{21} \ldots b_{M1}; b_{12} b_{22} \ldots b_{M2}; \ldots; b_{1N} b_{2N} \ldots b_{MN} \quad (2)$$

where the newly created sequence can be seen as being comprised of N codewords of length M.

After the interleaving the newly created sequence, i.e., the interleaved sequence, is packetized. Each packet is then assigned a frequency for transmission, e.g., a frequency hop in frequency hopping systems. Then each packet is transmitted on its assigned frequency, as determined by the communication system.

Figure 3:
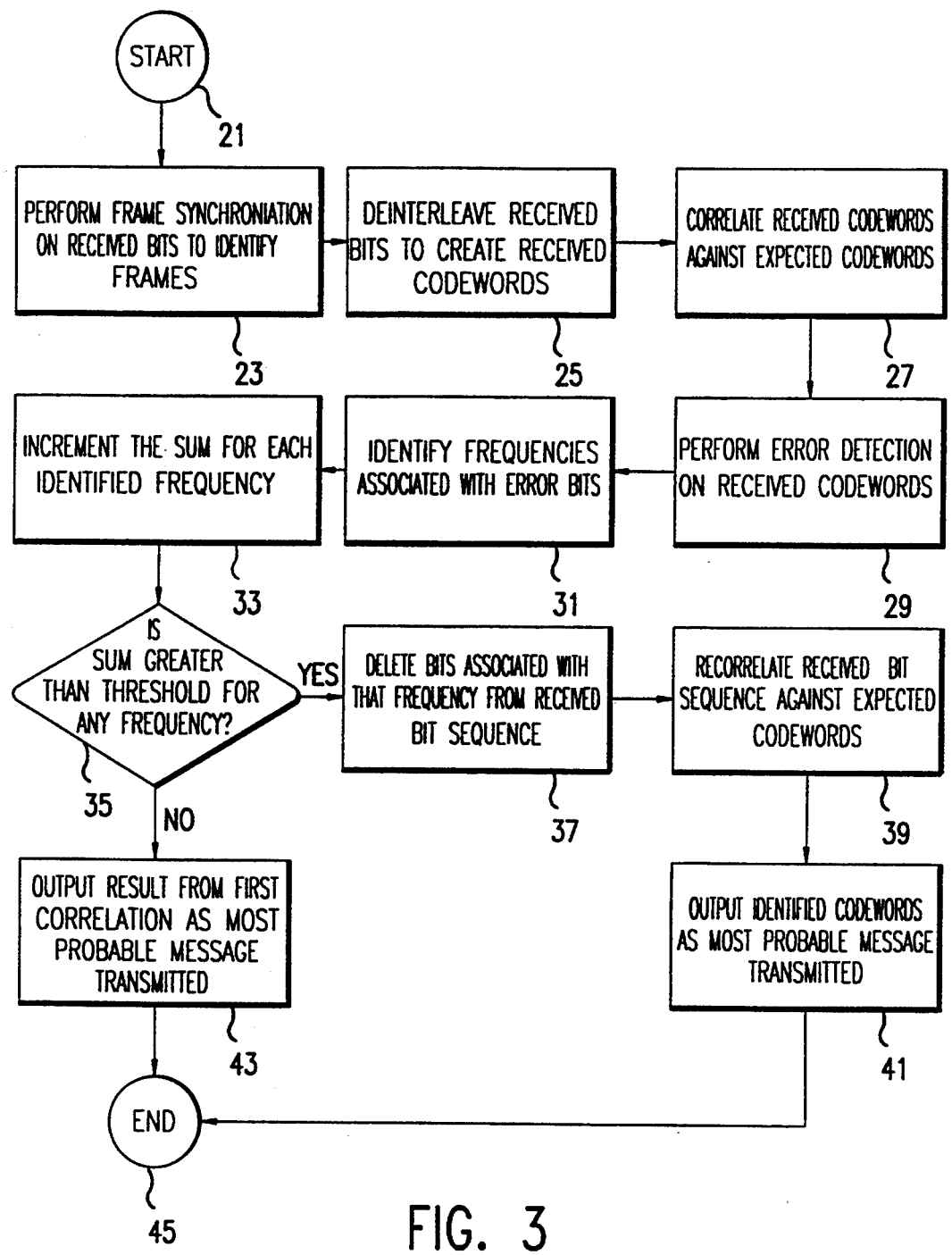
FIG. 3 depicts the a flow chart method of the present invention for the receiving end.

FIG. 3 depicts the steps involved in processing the transmitted sequence in the receiver. Prior to performing any processing in the receiver according to the method of the present invention, a receiver operating according to the present invention must first establish frame synchronization relative to the fixed length code sequence used as part of the message format. This is necessary to perform the processing of the received message, which processing relies on the mapping between the code sequence, or code word, which was to be transmitted and the frequency hopping sequence actually used to transmit that code sequence, i.e., the relationship between the bits received and the frequency hop on which their representative signals were received.

After bit synchronization, but prior to frame synchronization, the received data sequence is deinterleaved in an attempt to recreate the codeword sequence, as it existed prior to interleaving. The resulting sequence of received codewords is then correlated against the expected code words to determine the most probable information sequence that was transmitted. The relative hop on which each data bit was transmitted is identified and stored in memory. The de-interleaved data sequence is then checked to determine if it contains any data errors.

Error detection is used to identify those bits in the received code word sequence that have been corrupted. Error detection is possible at this stage since the receiver has determined the most probable code word sequence. For example, if the code word depicted in FIG. 1 "0100110001110000" with "i"=16 is being used to transmit a logic state "ONE" and its inverse "1011001110001111" is being used to transmit a logic state "ZERO", and the received sequence is "0110111001110000" then the receiver is able to detect that the third and seventh most significant bits contain errors with respect to a transmission of the logic state "ONE". The receiver performs this detection, in a known manner, by correlating the received sequence against the expected code words. In this operation, the receiver takes advantage of the redundant information contained within the code word. By determining the relative probabilities between whether a "ONE" was transmitted or whether a "ZERO" was transmitted, the receiver can decide whether it is more likely that a "ONE" was transmitted than a "ZERO" or vice versa. For example, the receiver may decide that is more likely that "1011001110001111" (a logic "ONE") was transmitted, since there are more bits in the received sequence "0110111001110000" that match "1011001110001111" than match its inverse "1011001110001111" (a logic "ZERO").

The frequency hops associated with the corrupted bits are then determined. After correlation of the received sequence with the expected transmitted sequence, all received bits not matching the expected code word, which the receiver decides is more likely to have been transmitted, are designated as "misfits" or potential error bits. Each misfit is then traced to the relative frequency hop in which it was transmitted, i.e., the frequency at which the signal representing the misfit bit was transmitted is identified.

A register is provided for each frequency hop that has been identified as resulting in a misfit. The register contains a sum of the number of misfits identified as originating from that frequency hop. Once the sum of the misfits originating from that frequency exceeds a predetermined threshold value, that hop is then determined to be an interfering hop, i.e., an interfering signal may exist that operates at the frequency associated with the misfit. The contents of the register is continually compared to the threshold to determine if the quantity of errors is significant. If the threshold is exceeded, the receiver drops those bits belonging to the identified frequency hop, since they may affect the accuracy of the receiver's decision. All received data associated with the identified interfering frequency hop interval, i.e., the misfits as well as valid data, are dropped from the original received data sequence, to create a new data sequence. The resulting sequence is then correlated against the expected codewords. The output from this second correlation is the most probable codeword sequence transmitted, which is easily converted into its underlying information sequence. A second correlation against the expected code words to be used in the communication results in a more accurate decision in the receiver, i.e., this second correlation process yields the most probable code word transmitted. This most probable transmitted code word is then used in place of the original received pattern for additional processing by the receiver to convert the data sequences into the information the communication system was trying to transmit.

Finally, the method of the present invention enables a frequency hopping system to hop as close to existing signals as possible, since only those error bits, which may be due to interference, will be dropped. This increases the probability that potential eavesdroppers or jammers will be prevented from recovering the actual data being transmitted because they must, among other things, separate the frequency hopping transmission from all others to even determine what the frequency hopping sequence was, which is the first step in trying to predict what future frequency hopping sequences will actually be. Therefore, the method of the present invention also improves the ability of a frequency hopping system to defeat potential jammers or eavesdroppers.

The method of the present invention has been described relative to frequency hopping communication systems, however, the technique of the present invention is not limited to only frequency hopping communication systems. Other applicable systems include spread spectrum communication systems. For example, each frequency used in the spread could be correlated against errors detected in bits corresponding to signals transmitted at those frequencies, in a similar manner as that described above. Then the spread spectrum communication system could block out those frequencies containing inordinate amounts of errors, as described above.

The method of the present invention could also apply to communication systems that transmit at multiple frequencies. All that is required is a correlation between detected bit errors and the frequencies at which the signal representing those detected bit errors were transmitted. For example, in a digital communication system that has several frequencies available for transmitting packets of information, the information data could first be converted to codewords, then the code words could be interleaved among themselves to create a new data sequence. After the new data sequence is converted to packets, the packets could then be transmitted on different frequencies.

The receiver then could rearrange the packets in a known manner, to create a received data sequence. Then, the receiver would de-interleave the data, in a known manner to create a data sequence comprised of several code words. Each part of the data sequence so created would be correlated against the expected codewords to determine the most probable code words that were transmitted. After determining these code words, the receiver can then detect the error bits, i.e., the bits that were corrupted during transmission. By tracing the error bits to the frequency over which they were transmitted, the receiver can then calculate the total number of error bits resulting from that frequency. As described above, when the sum exceeds a predetermined threshold, the receiver drops the bits associated with the interfered frequency from the received sequence so that these bits will not impact any further processing. The new received sequence is then recorrelated against the expected code words to create the most probable information sequence that was transmitted. Thus, the present invention applies to any communication system that utilizes multiple frequencies in its transmission.

As an example of the improvement in reliable data achieved by the present invention, we shall consider the following example. Suppose the transmitter determines that a non-inverted redundant data pattern is to be transmitted. We shall assume the non-inverted pattern is "0100110001110000". Due to potential interference and poor RF link quality, the receiving radio recovers a different pattern, which is: "0001110110101101". The receiver then performs an initial comparison between the recovered data pattern and a standard non-inverted (error free) pattern, i.e., the two expected codewords. The result of this logical comparison is "0101000111011101". If the receiver were to make its decision at this point, the receiver would falsely determine that an inverted redundant pattern had been transmitted. The majority of the bits tested in the comparison (9 of 16) are logical disagreements with the standard non-inverted pattern. Thus, the erroneous decision would be that the inverted pattern was transmitted.

The present invention provides that the receiver traces the nine identified disagreement bit positions back to the hop interval or intervals in which they were received. If the number of error bits associated with a hop exceeds its threshold, then that hop is determined to be an interfered hop.

Next, the original recovered pattern is compared a second time against the standard pattern, with all bit positions associated with an interfered hop being excluded from the decision process. As a result, the majority vote decision is made on a smaller quantity of bits believed to be from non-interfered hops. For example, assuming that bits two, eight and thirteen were deemed to be from interfered hops, the logical comparison would output the sequence "0X01000X1101X101", where X denotes a "DON'T CARE" or a result excluded from the decision process. Thus, the receiver decision is now based on a comparison across thirteen bits, rather than sixteen bits. In this case, the receiver correctly determines that a non-inverted redundant pattern was transmitted, since a majority of the bits tested are in agreement with this result. Therefore, the present invention will result in improved data reliability.

Figure 4A:
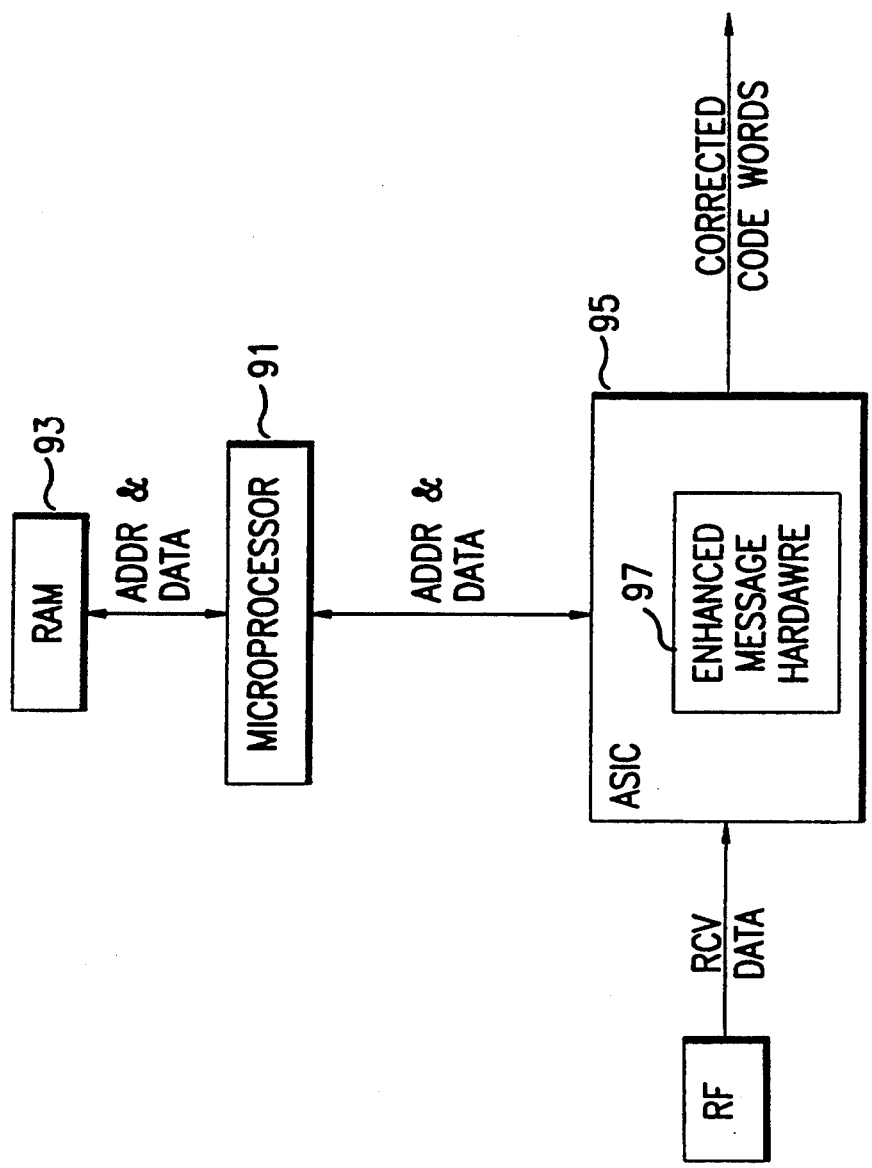
FIGS. 4a-b depict an embodiment of the present invention.
Figure 4B:
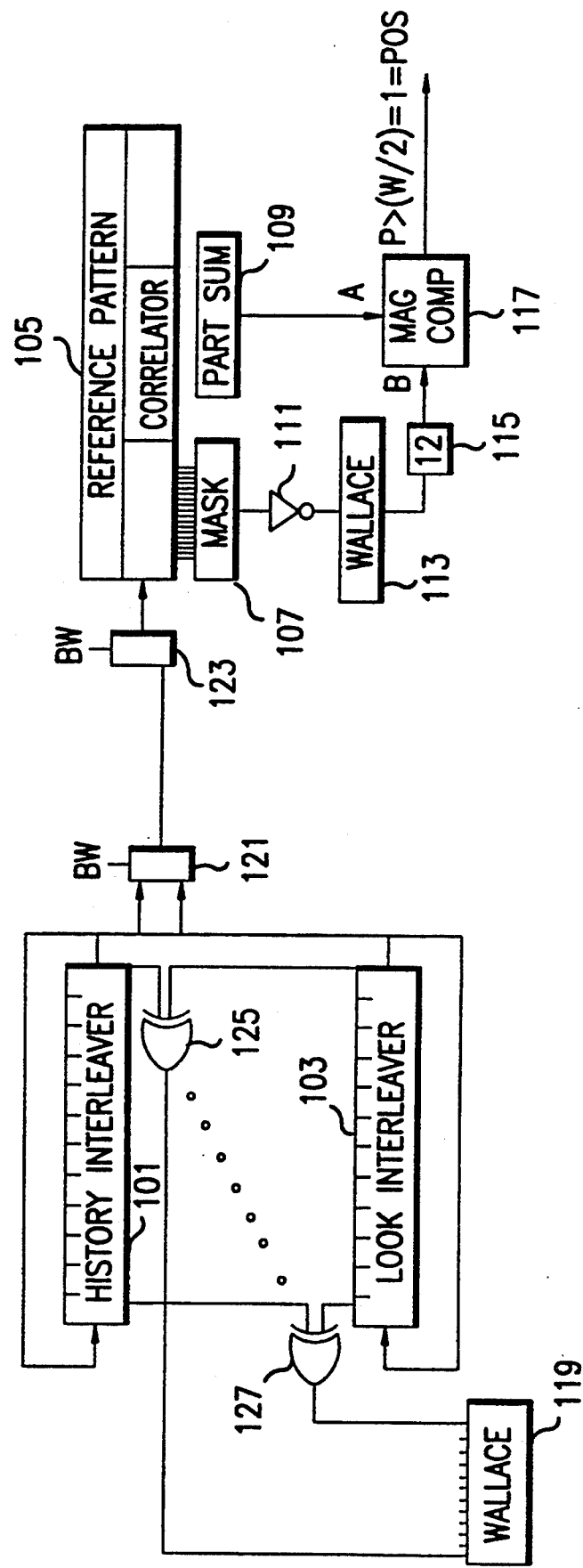

FIGS. 4a–b depict one embodiment of the present invention for use in a frequency hopping system. Referring to FIG. 4a, a general system is shown comprising a standard microprocessor 91 coupled between a RAM 93 and an ASIC 95. Received data enters the ASIC 95 and is buffered in the RAM 93, by the microprocessor 91. Data is moved from the RAM 93 to the ASIC 95 by the microprocessor 91 for processing code words within the received data. The corrected code words exit the ASIC 95 as part of the received data. The processing of the code words is performed by enhanced message hardware 97 within the ASIC 95.

Referring to FIG. 4b, the enhanced message hardware of FIG. 4a is shown. Two interleavers, a History interleaver 101 and a Look interleaver 103, operate in parallel. XOR gates (125 . . . 127) are connected at a periodic interval equal to the interleaving distance of the interleavers 101, 103. The outputs of these XOR gates 125 . . . 127 are passed to the Wallace tree adder 119. The outputs of the interleavers 101, 103 are coupled to the correlator 105 via two switches 121 and 123. Expected code word patterns are loaded as a reference pattern into correlator 105. A mask register 107 is coupled to the first bits representing the most recent phi pattern in correlator 105. The mask register 107 is coupled to the Wallace tree adder 113 via an INV gate 111. The output from the Wallace tree adder is halved by the divider 115 and passed to the magnitude comparator 117, which compares the value B output from the divider 115 to the value A output from the correlator partial sum register 109.

Assuming frame synch has been achieved, and history data has been collected from the 1/0 phasing, the received bit sequence is deinterleaved using both History 101 and Look interleavers 103. Next, the bit error history is rotated to make room for the history from the next hop of data. A mask is then calculated from history previously collected, which indicates which hops appear bad. The mask should be justified such that the rightmost mask bit corresponds to the rightmost bit in the aligned Look interleaver 103. The mask is then written into the mask register 107. The code word boundary is aligned to the right of both interleavers 101 and 103. The History interleaver 101 is then disabled and the correlator 105 is enabled. The first code word is shifted from the Look interleaver 103 into the correlator 105. The code word polarity is read from the magnitude comparator 117. If the inverted code word is detected, the perfect inverted code word is written to the left side of the Look interleaver 103. If the non-inverted code word is detected, then the perfect non-inverted code word is written to the left side of the Look interleaver 103. Then, another code word is shifted into the correlator 105, which in turn shifts the mask register 107 and the Look interleaver 103. The diagonal in the Look interleaver 103 is then re-aligned to its original position. After processing all available data in the current diagonal, all whole code words in the current diagonal are corrected. The number of bits in error are read from the Wallace tree adder 119. The number is added to the bit error history corresponding to the current hop. Then, the sequence is re-interleaved by the Look interleaver 103.

What is claimed is:

1. A method for operating a multifrequency communication system, comprising the steps of:
 a) correlating a received data sequence against expected code words used in transmission;
 b) detecting an error bit in the received data sequence;
 c) identifying a frequency associated with the error bit;
 d) increasing by one a sum associated with said frequency upon detection of the error bit;
 e) comparing the sum against a threshold to determine if the sum exceeds the threshold; and f) dropping a bit associated with the frequency from the received data sequence, if the sum exceeds the threshold.

2. The method according to claim 1, further comprising the step of correlating said expected code words against a received data sequence with at least one dropped bit, whereby said second correlation results in a most probable transmitted sequence.

3. The method according to claim 1, further comprising the steps of:
   g) distributing an information sequence comprised of a plurality of code words among a plurality of frequencies so that part of each code word are transmitted on different frequencies; and
   h) reversing the distribution in step g) on the received sequence to form a received codeword sequence comprised of a plurality of received code words.

4. The method according to claim 3, wherein the step of distributing further comprises interleaving the code words among each other and assigning an interleaved sequence to a plurality of frequencies for transmission, and the step of reversing the distribution further comprises de-interleaving the received sequence to attempt to form the information sequence.

5. A method for operating a frequency hopping communication system, comprising the steps of:
   a) correlating a received data sequence against expected code words used in transmission;
   b) detecting an error bit in the received data sequence;
   c) identifying a frequency hop associated with the error bit;
   d) increasing by one a sum associated with said frequency of the frequency hop upon detection of the error bit;
   e) comparing the sum against a threshold to determine if the sum exceeds the threshold; and
   f) dropping a bit associated with the frequency from the received data sequence, if the sum exceeds the threshold.

6. The method according to claim 5, further comprising the step of correlating the expected code words against a received data sequence with the dropped bits, whereby said second correlation results in a most probable transmitted sequence.

7. The method according to claim 5, further comprising the steps of:
   g) distributing an information sequence comprised of a plurality of code words among a plurality of frequencies hops so that parts of each code word are transmitted on a different frequency hops; and
   h) reversing the distribution in step g) on the received sequence to form a received codeword sequence comprised of a plurality of received code words.

8. The method according to claim 7, wherein the step of distributing further comprises interleaving the code words among each other and assigning an interleaved sequence to a plurality of frequency hops for transmission, and the step of reversing the distribution further comprises de-interleaving the received sequence to attempt to form the information sequence.

9. A communication system operating on a plurality of frequencies, comprising the steps of::
   a) a transmitter transmitting a plurality of codewords on a plurality of frequencies;
   b) a receiver receiving a received data sequence, and including:
      (i) a correlator correlating a received data sequence against a plurality of expected code words used by the transmitter;
      (ii) an error detector detecting an error bit in the received data sequence;
      (iii) means for identifying a frequency associated with the error bit;
      (iv) a summation element assigned to a first frequency for which an error bit has been associated, and increasing by one upon detection of an error bit associated with the first frequency;
      (v) a comparator comparing a sum in the summation element against a threshold to determine if the sum exceeds the threshold; and
      (vi) means for dropping bits associated with the first frequency from the received data sequence, if the sum exceeds the threshold.

10. The system according to claim 9, wherein the receiver performs a second correlation against the expected code words using the received data sequence with the dropped bits, whereby said second correlation results in a most probable transmitted sequence.

11. The system according to claim 9, further comprising:
   a) means for distributing an information sequence comprised of a plurality of code words among a plurality of frequencies so that part of each code word are transmitted on different frequencies; and
   b) means for reversing the distribution in step g) on the received sequence to form a received codeword sequence comprised of a plurality of received code words.

12. The system according to claim 11, wherein the means for distributing further comprises means for interleaving the code words among each other and means for assigning an interleaved sequence to a plurality of frequencies for transmission, and the means for reversing the distribution further comprises means for de-interleaving the received sequence to attempt to form the information sequence.

13. A frequency hopping communication system, comprising:
   a) a transmitter transmitting a plurality of codewords on a plurality of frequency hops;
   b) a receiver hopping in synchronization with the transmitter and receiving a received data sequence, and including:
      (i) a correlator correlating a received data sequence against a plurality of expected code words used by the transmitter;
      (ii) an error detector detecting an error bit in the received data sequence;
      (iii) means for identifying a frequency hop;
      (iv) a summation element assigned to a first frequency hop for which an error bit has been associated, and increasing by one upon detection of an error bit associated with the first frequency hop;
      (v) a comparator comparing a sum in the summation element against a threshold to determine if the sum exceeds the threshold; and
      (vi) means for dropping bits associated with the first frequency hop from the received data sequence, if the sum exceeds the threshold.

14. The system according to claim 13, wherein the receiver performs a second correlation against the expected code words using the received data sequence with the dropped bits, whereby said second correlation results in a most probable transmitted sequence.

15. The system according to claim 13, further comprising:
    a) means for distributing an information sequence comprised of a plurality of code words among a plurality of frequency hops so that part of each code word are transmitted on different frequency hops; and
    b) means for reversing the distribution in step g) on the received sequence to form a received codeword sequence comprised of a plurality of received code words.

16. The system according to claim 15, wherein the means for distributing further comprises means for interleaving the code words among each other and means for assigning an interleaved sequence to a plurality of frequency hops for transmission, and the means for reversing the distribution further comprises means for de-interleaving the received sequence to attempt to form the information sequence.

17. A method for reducing the effects of interference in a multifrequency communication system in which information is coded in a data sequence that is transmitted over a plurality of frequencies, comprising the steps of:
    a) comparing a received data sequence to a plurality of expected code words;
    b) selecting, based on said comparing step, one of said expected code words as corresponding to said received data sequence;
    c) determining if any bit in said one of said expected code words is not found in said received data sequence and identifying any differing bit in said received data sequence as an error bit;
    d) if an error bit is detected then
        (i) determining a transmission frequency corresponding to said error bit;
        (ii) incrementing a sum associated with said determined transmission frequency;
        (iii) comparing said sum to a threshold value and if it exceeds said threshold value, identifying said determined transmission frequency as a frequency receiving interference.

18. The method according to claim 17, further comprising the step of:
    e) deleting all bits transmitted on said determined transmission frequency from a received data sequence to form a new data sequence.

19. The method according to claim 18, further comprising the step of:
    f) comparing the new data sequence to the plurality of expected code words, and using a result of the comparing as a receiver's decision.

* * * * *

UNITED STATES PATENT AND TRADEMARK OFFICE
CERTIFICATE OF CORRECTION

PATENT NO. : 5,452,319                                         Page 1 of 2

DATED : September 19, 1995

INVENTOR(S) : Michael W. COOK et al.

It is certified that error appears in the above-identified patent and that said Letters Patent is hereby corrected as shown below:

| Column | Line | |
|--------|------|---|
| 3  | 8  | Delete "comprises". |
| 4  | 38 | After "are" change "the" to --then--. |
| 4  | 41 | Change "that" to --are--. |
| 4  | 55 | After "bit" insert --is--. |
| 5  | 7  | After "These" delete ",". |
| 6  | 48 | After "$b_{2N};...$" insert --;--. |
| 6  | 58 | After "interleaving" insert --,--. |
| 7  | 67 | Change "is" to --are--. |
| 11 | 13 | Change "part" to --parts--. |
| 11 | 51 | Change "frequencies" to --frequency--. |
| 12 | 27 | Change "part" to --parts--. |

UNITED STATES PATENT AND TRADEMARK OFFICE
CERTIFICATE OF CORRECTION

PATENT NO. : 5,452,319

DATED : September 19, 1995

INVENTOR(S) : Michael W. COOK et al.

It is certified that error appears in the above-identified patent and that said Letters Patent is hereby corrected as shown below:

| Column | Line | |
|--------|------|---|
| 12 | 30 | Replace "in step g)" with --of the distributing means--. |
| 13 | 8 | Change "part" to --parts--. |
| 13 | 11 | Replace "in step g)" with --of the distributing means--. |

Signed and Sealed this

Nineteenth Day of March, 1996

*Attest:*

BRUCE LEHMAN

*Attesting Officer*    *Commissioner of Patents and Trademarks*